United States Patent [19]

Moran

[11] Patent Number: 4,894,520

[45] Date of Patent: Jan. 16, 1990

[54] CIRCUIT FOR CONTROLLING POWER DISSIPATED BY AN ELECTRICAL RESISTANCE

[75] Inventor: Steven A. Moran, Mt. Lebanon, Pa.

[73] Assignee: Westinghouse Electric Corp., Pittsburgh, Pa.

[21] Appl. No.: 205,694

[22] Filed: Jun. 13, 1988

[51] Int. Cl.$^4$ .............................................. H05B 1/02
[52] U.S. Cl. ..................................... 219/497; 219/501; 219/505; 219/494; 323/364
[58] Field of Search ............... 219/490, 494, 497, 499, 219/501, 505, 507–509; 323/235, 319, 236, 364; 307/117

[56] References Cited

U.S. PATENT DOCUMENTS

| | | | |
|---|---|---|---|
| 3,553,428 | 1/1971 | McGhee | 219/494 |
| 3,956,978 | 5/1976 | Borley | 219/501 |
| 4,170,932 | 10/1979 | Lalancette | 219/497 |
| 4,340,807 | 7/1982 | Raskin et al. | 219/497 |
| 4,495,405 | 1/1985 | Foster | 219/497 |
| 4,546,239 | 10/1985 | Sugimori | 219/497 |
| 4,594,501 | 6/1986 | Culley et al. | 219/501 |

Primary Examiner—M. H. Paschall

[57] ABSTRACT

A circuit for controlling the power dissipated by an electrical resistance coupled to a supply voltage which varies, includes a feedback circuit, coupled to the electrical resistance, for producing a feedback current corresponding to the current flowing through the heater. A correction circuit produces a correction current corresponding to variations in the supply voltage. An integrator receives the correction current and the feedback current and amplifies the error indicated by the correction current and the feedback current. A pulse width modulator receives the amplified error and controls the ON time of a switching device to control the flow of current through the electrical resistance. The flow of current through the electrical resistance is controlled to maintain the power dissipated by the resistance constant.

21 Claims, 3 Drawing Sheets

CIRCUIT FOR CONTROLLING POWER DISSIPATED BY AN ELECTRICAL RESISTANCE

BACKGROUND OF THE INVENTION

The present invention relates to a circuit for controlling the power dissipated by an electrical resistance and particularly to a circuit which does not require an RMS to DC converter.

Electrical resistance heaters are used in a variety of environments. While control of the power dissipated by the electrical resistance heater is not always critical, in certain environments, it is critical that the power dissipated by the electrical resistance heater be controlled so that it does not vary by more than a small percentage.

An example of one type of environment in which the control of the power dissipated by an electrical resistance heater is critical is in a split thermowell in a water induction monitoring system. A water induction monitoring system may be used in a power plant to check for water in the steam lines of a steam turbine. The water induction monitoring system typically includes a plurality of split thermowells which are positioned in the steam lines.

FIG. 1 is a schematic cross-sectional view of an example of a split thermowell 20 which is employed in a water induction monitoring system. Referring to FIG. 1, the split thermowell 20 is mounted in a steam line or pipe 22 and extends approximately 8 inches into the steam pipe. The split thermowell 20 includes a casing 24 having a U-shaped portion 26. Mounted within the casing 24 are an electrical resistance heater 28 and thermocouples 30 and 32. The resistance heater 28 is coupled to a power-supply 29 and is used to heat the thermocouples 30 and 32 which in turn provide sensing signals T1 and T2, respectively, to a central control circuit (not shown). As long as there is no water between the legs of the U-shaped portion 26 of the casing 34, the difference between the two temperature signals T1 and T2 output by the thermocouples 30 and 32 should be relatively high (on the order of 10° to 200° F.). However, if the difference between the temperature signals T1 and T2 drops to less than 10° F., then this is an indication that there is water between the legs of the U-shaped portion 26, due to the fact that water has a thermoconductivity which is greater than that for steam. When this drop in the difference in temperature is detected, the water induction monitoring system will issue an alarm.

In order for the split thermowell 20 to function properly, it is necessary that the power of the electrical resistance heater 28 be regulated. The power dissipated by the resistance heater 28 is given by the following equation:

$$P = I_{RMS}^2 \times R_H \qquad (1)$$

where $I_{RMS}$ is the RMS current flowing through the heater 28 and $R_H$ is the resistance value of the resistance heater 28. There are typically variations in the supply voltage which is provided to the resistance heater 28. Since the resistance value of the resistance heater 28 does not change, such variations in the supply voltage will result in variations in the current ($I_{RMS}$) flowing through the resistance heater 28, with resulting variations in the power (P) dissipated by the electrical resistance heater 28. Thus, the power will tend to vary unless the RMS current of the resistance heater 28 is regulated. The power dissipation in the resistance heater 28 in a split thermowell 20 is controllable to be from 5 to 65 watts based on its position in the system. Typically, the RMS current through the resistance heater is controlled to keep the power dissipated constant.

The RMS current of an electrical resistance heater for pulsed current waveforms (e.g., see FIG. 2) is given by the following equation:

$$I_{RMS} = I_{peak} \sqrt{\frac{t_{on}}{T}} \qquad (2)$$

Thus, in order to maintain the RMS current constant, it is necessary to adjust the duty cycle ($t_{on}/T$) with variations in the peak current.

FIG. 2 is a waveform diagram illustrating the duty cycle for the current waveform of the current flowing through the resistance heater 28. Thus, the RMS heater current ($I_{RMS}$) must be regulated because the peak current will change with line voltage variations which may vary by as much as ±10%. If it is assumed that the resistance value of the heater 28 stays the same, then in order to have the power maintained constant, the ON time of the current which flows through the resistance heater 28 must be controlled. For example, the higher the current, the more OFF time that is required. In the prior art, a switching type regulator utilizing pulse width modulation or phase control is commonly used for heater current control to produce a pulsed heater current waveform of the type illustrated in FIG. 2.

As indicated above, there are a number of circuits employing electrical resistance heaters for which control of the power dissipated by the electrical resistance heater is desirable. An example of one circuit which has been employed in the prior art to control the power dissipated by an electrical resistance heater is illustrated in the block diagram of FIG. 3 of the drawings. In FIG. 3, an electrical resistance heater 34 has a resistance $R_H$ and is coupled to a supply voltage $V_{BUS}$. While the resistance $R_H$ will tend to remain constant, there will typically be variations in the supply voltage $V_{BUS}$. A sensing resistor 36 has a resistance $R_S$ and is employed to sense the current flowing through the resistance heater 34. An RMS to DC converter 38 including a squaring circuit 40, an averaging filter 42 and a square root circuit 44, squares the voltage across the sensing resistor 36, averages the squared voltage and takes the square root of the average, to provide a voltage signal which is proportional to the RMS current flowing through the resistance heater 34. This feedback voltage is then subtracted from a voltage corresponding to the RMS current reference value by a subtractor 46 to provide a current error signal. The current error signal is amplified by an integrator 48 which provides the high steady state loop gain required for precise regulation. The amplified current error signal is applied to a pulse width modulator 50 which generates the required duty cycle for driving a switching device 52 such as a MOSFET, bipolar transistor, etc. When the switching device 52 is ON, current flows through the resistance heater 34. The current which flows through the heater 34 is determined by the supply voltage $V_{BUS}$ and the resistance values $R_H$, $R_S$ and the resistance of the switching device 52.

Since the supply voltage $V_{BUS}$ is unregulated it will tend to vary with the AC supply voltage by ±10%. The RMS to DC converter 38 is required because of this DC supply voltage variation. Without the RMS to DC converter 38, the control circuit would act to regulate the average heater current rather than the RMS heater current. As a result, the heater power dissipation would vary by the same percentage as the DC bus voltage variation (i.e., ±10%) if the average heater current is maintained constant. By employing the RMS to DC converter 38, the RMS current is controlled to within ±1% with line voltage variations of ±10%. While RMS to DC converters are available as monolithic integrated circuits, accurate laser trimmed versions of these converters are very expensive, and lower cost versions require undesirable external trimming. Further, in systems with a large number of electrical resistance heaters, it is necessary to provide such a high cost RMS to DC converter for each electrical resistance heater. For example, in the water induction monitoring system described above, there may be as many as fifty thermowells 20, and thus fifty electrical resistance heaters 28 in the monitoring system. Therefore, each electrical resistance heater 28 will require an expensive RMS to DC converter to control the power dissipated by the electrical resistance heater 28.

There is a need in the art for a low cost circuit for accurately controlling the power dissipated by an electrical resistance heater.

SUMMARY OF THE INVENTION

The present invention is directed to a circuit for controlling the power dissipated by an electrical resistance which overcomes the deficiencies of the prior art.

In particular, the present invention is directed to providing a circuit for controlling the power dissipated by an electrical resistance and particularly an electrical resistance heater, which does not employ an RMS to DC converter.

The circuit for controlling the power dissipated by an electric resistance in accordance with the present invention includes means, coupled to the electrical resistance, for providing a feedback current corresponding to a current flowing through the electrical resistance. The circuit further includes means for providing a correction current corresponding to variations in the supply voltage, and means for receiving the correction current and the feedback current, for amplifying the error indicated by the correction current and the feedback current, and for controlling the flow of current through the electrical resistance to control the power dissipated by the electrical resistance. In the preferred embodiment, the electrical resistance is an electrical resistance heater, and the circuit of the invention is used to maintain the power dissipated by the electrical resistance heater constant.

In the control circuit of the present invention, the means for providing the correction current includes means for providing a variable current corresponding to variations in the supply voltage, means for providing an RMS reference current and means for providing an additional reference current. The RMS reference current, the variable current and the additional reference current are combined to produce the correction current which is combined with the feedback current. In one embodiment, the means for providing the additional reference current comprises a Zener diode and a resistor.

In another embodiment, the means for providing the additional reference current is selected to have values so that the means for providing the RMS reference current can be removed from the circuit.

These together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
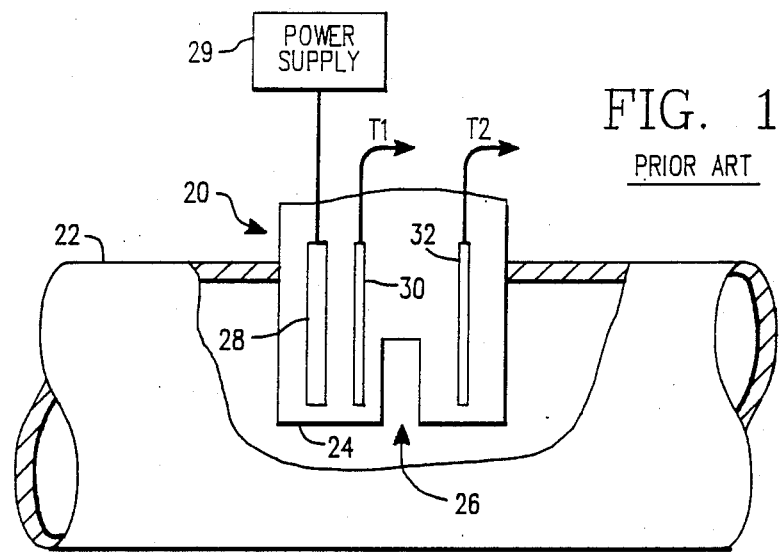
FIG. 1 is a schematic cross-sectional view of a thermowell having an electrical resistance heater.
Figure 2:
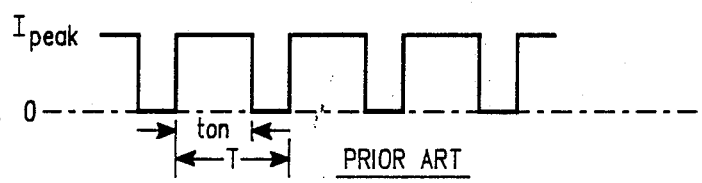
FIG. 2 is a waveform diagram for illustrating the duty cycle of a current waveform for current flowing through an electrical resistance heater.
Figure 3:
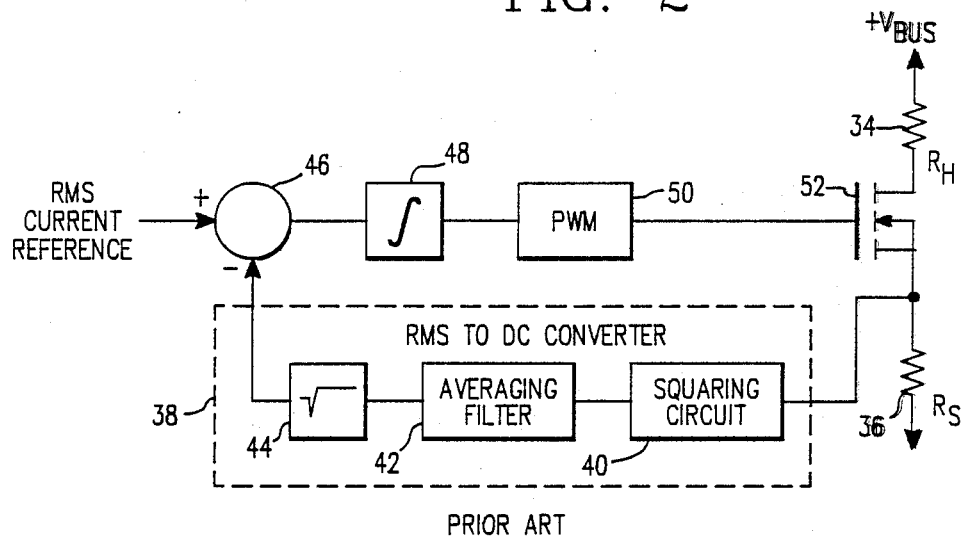
FIG. 3 is a block diagram of a prior art control circuit for controlling the power dissipated by an electrical resistance heater.

The present invention is based on the discovery by applicant that for pulsed current waveforms such as that shown in FIG. 2, in order for the RMS current to remain constant as the DC supply voltage changes, the average current through the resistance heater must change in accordance with the following equation:

$$I_{avg}(V_{BUS}) = \frac{I_{avg}(V_{nom}) V_{nom}}{V_{BUS}} \qquad (3)$$

where $I_{avg}(V_{BUS})$ is the average heater current at the supply voltage $V_{BUS}$, $I_{avg}(V_{nom})$ is the average heater current at the nominal bus voltage (i.e., $I_{avg}(V_{nom}) = I_{peak} \times t_{on}/T$) and $V_{nom}$ equals the nominal bus voltage. Thus, $V_{nom}$ equals the assigned or nominal value of the voltage, while $V_{BUS}$ equals the actual value of the supply voltage which may vary by ±10% from the nominal value.

Figure 4:
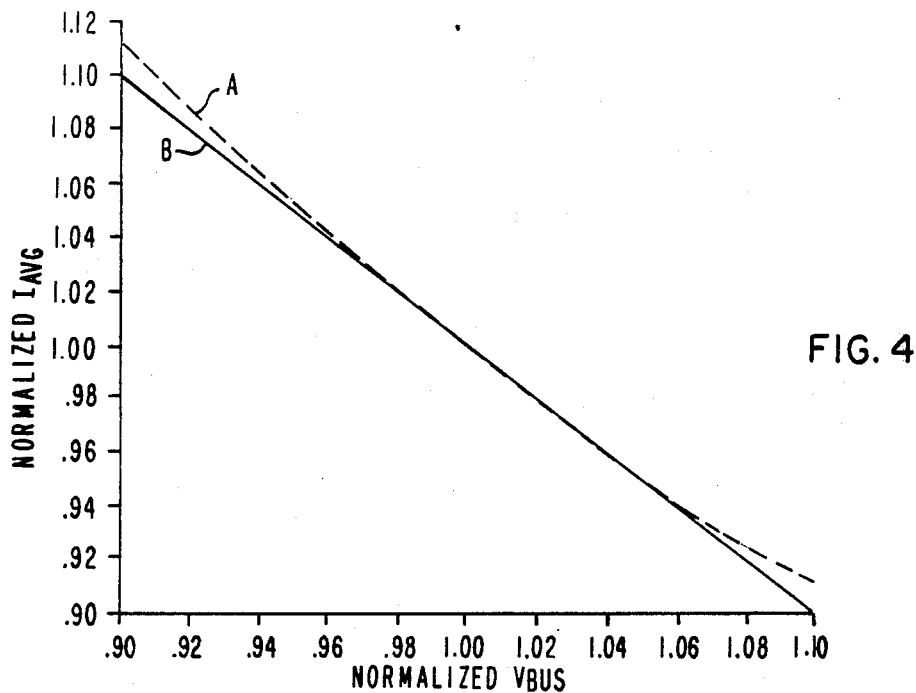
FIG. 4 is a graph of the normalized average current required in order for the RMS current flowing through an electrical resistance heater to remain constant, versus the normalized DC supply voltages which varies by ±10%.

FIG. 4 is a graph of the normalized average current required in order for the RMS current to remain constant, versus the normalized supply voltage which varies by ±10%. The dashed curve A in FIG. 4 illustrates the average currents which must be provided for the variations in the supply voltage which are indicated. That is, the dashed curve A shows what the average current must be in order to maintain a constant power dissipation. The solid line B in FIG. 4 is a straight line or linear approximation of the dashed curve A.

Figure 5:
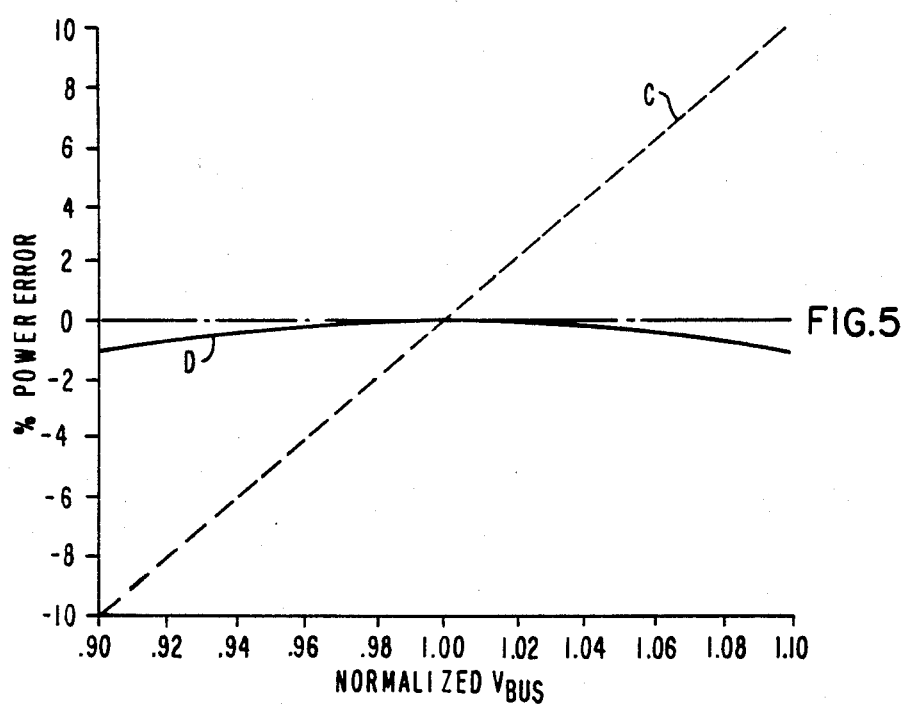
FIG. 5 is a graph of a percentage power error versus the normalized supply voltage if the average current is determined by the straight line approximation of the curve in FIG. 4.

FIG. 5 is a graph of the percentage power error versus the normalized bus voltage. Line C illustrates the percentage power error if the average current remains constant, while curve D shows the percentage power error if the average current through the resistance heater is varied in accordance with the straight line approximation B of FIG. 4. As is clear from curve D, the power error is at most −1% when the supply voltage is at the maximum and minimum ends of its range of variation. Thus, it is clear that the straight line approximation for variations in the average current, which is illustrated by line B in FIG. 4, can be employed to control the average current so as to effectively control the power dissipated by the resistance heater. In fact, the percentage power error is as low as that provided by more expensive prior art RMS to DC converters.

Figure 6:
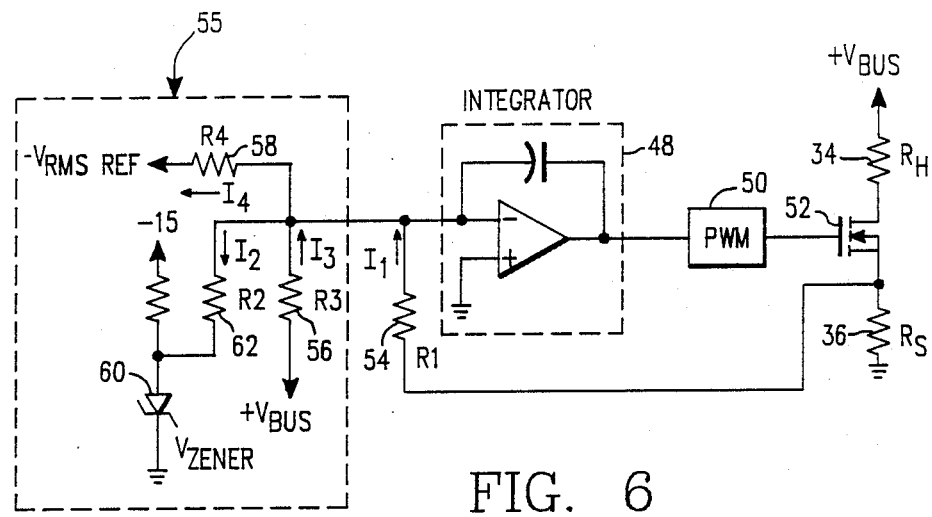
FIG. 6 is a circuit diagram of a circuit for controlling the power dissipated by an electrical resistance in accordance with a first embodiment of the present invention.

FIG. 6 is a circuit for implementing the linear changes in average current with variations in bus voltage, as illustrated by solid line B in FIG. 4. Referring to FIG. 6, in accordance with the first embodiment of the present invention, instead of feeding back a signal proportional to the RMS current flowing through the resistance heater 34, a correction current is produced by a correction circuit 55 based on variations in the supply voltage. The correction circuit 55 is a means for providing a correction current, and includes a resistor 56 which is coupled to the supply voltage $V_{BUS}$ to produce a variable current $I_3$ which varies with variations in the supply voltage $V_{BUS}$. Thus, resistor 56 forms a means for providing a variable current. A resistor 58 having a resistance value $R_4$ is coupled to an RMS reference voltage ($-V_{RMS\ REF}$) in order to produce an RMS reference current $I_4$. A reference Zener diode 60 and a resistor 62 having a resistance value $R_2$ form a means for providing an additional reference current $I_2$. Resistor 36 and a resistor 54 having a resistance value $R_1$ form a means for providing a feedback current $I_1$ corresponding to the current through the resistance heater 34.

In the preferred embodiment, the Zener diode 60 is a precision voltage reference Zener diode which is used to generate the additional reference current $I_2$ which is a constant current. The value $R_2$ of the resistor 62 is selected so that the additional reference current $I_2$ is equal to the value of the variable current $I_3$ when the supply voltage $V_{BUS}$ is at its nominal value. If the DC supply voltage ($V_{BUS}$) is below its nominal value, then variable current $I_3$ will be lower in magnitude than additional reference current $I_2$. As a result, the average heater current $I_{avg}$ (and thus the feedback current $I_1$), will be increased since the control loop will act to maintain $I_1 + I_3 - I_2 = I_4$ at steady state. If the DC supply voltage is above the nominal value, then $I_3$ will be greater in magnitude than $I_2$, thereby causing the heater average current $I_{avg}$ (and therefore the feedback current $I_1$) to decrease. The RMS reference current $I_4$ acts to control the duty cycle when the supply voltage is at its nominal level, since the duty cycle will be adjusted through closed loop control until the average value of $I_1 = I_4$.

The RMS heater current at the nominal bus voltage is provided by equation (2) where the peak current $I_{peak}$ is equal to the nominal bus voltage divided by $R_H + R_S + $ the resistance of switching element 52. The values of the circuit parameters are selected as follows. The precision voltage of the Zener diode 60 is initially selected. Then, $R_1$, $R_2$, $R_3$ and $R_4$ are selected to have values such that the following equations are satisfied:

$$R_2 = \frac{R_3 V_{zener}}{V_{nom}} \quad (4)$$

$$R_3 = \frac{R_1 V_{nom}}{V_S} \quad (5)$$

$$\frac{V_{rms\ ref}}{R_4} = \frac{V_S}{R_1} \quad (6)$$

where $V_S$ equals the average value of the voltage across resistor 36 at the nominal bus voltage and at the desired RMS heater current.

Figure 7:
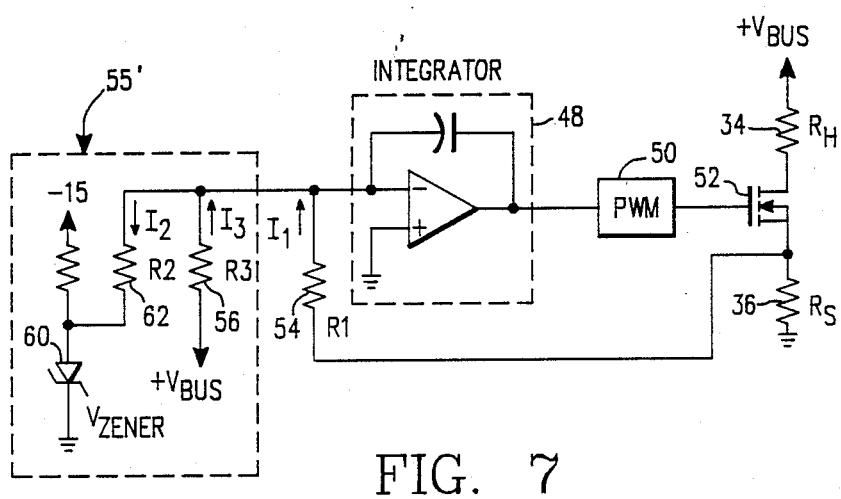
FIG. 7 is a circuit diagram of a circuit for controlling the power dissipated by an electrical resistance in accordance with a second embodiment of the present invention.

As illustrated by the embodiment of FIG. 7, the circuit of the present invention can be simplified since $I_2$ and $I_4$ are always constant. If $R_2$ is selected to have a value equal to the voltage of the Zener diode 60 divided by ($I_2 + I_4$) then resistor 58 can be eliminated from the correction circuit so that a modified correction circuit 55' results (see FIG. 7), because the voltage of the Zener diode 60 is used as the sole reference.

Referring back to FIG. 6, since the variable current $I_3$ is a DC current, while the feedback current $I_1$ is a pulse current, the integrator 48 is used to filter out the pulsing and provide a DC level output. If the feedback current $I_1$ increases due to an increase in the supply voltage, then the pulse width of the pulse width modulator 50 is controlled to decrease. If the feedback current $I_1$ decreases due to a decrease in the supply voltage, then the pulse width output of the pulse width modulator 50 is controlled to increase. Together, the integrator 48 and the pulse width modulator 50 form a means for receiving the correction current and the feedback current, for amplifying the error indicated by the correction current and the feedback current, and for controlling the flow of current through the resistance heater 34 to control the power dissipated by the resistance heater 34. In the preferred embodiment, the flow of current through the resistance heater 34 is controlled to maintain the power dissipated by the resistance heater 34 constant. Further, as illustrated by the circuits of FIGS. 6 and 7, the present invention is directed to a heater formed by the electrical resistance heater 34 and means for controlling the average current flowing through the heater 34 to satisfy equation (3) (i.e., the circuitry other than resistance heater 34).

The circuit for controlling power dissipated by an electrical resistance in accordance with the present invention is advantageous in that it provides power control within −1% over a ±10% variation in supply voltage by employing a very simple, low cost circuit which does not employ an RMS to DC converter. Thus, the circuit of the present invention provides power control which essentially corresponds to that provided by a circuit including an RMS to DC converter, without the incumbent complexity and expense which is associated with such an RMS to DC converter circuit. The circuit of the present invention for controlling the power dissipated by an electrical resistance may be implemented in numerous ways. For example, while the precision reference voltage is described as being provided by a Zener diode 60, any other suitable type of reference voltage supply may be employed. While a specific embodiment of a correction circuit for providing a correction current corresponding to variations in the supply voltage has been illustrated in FIGS. 6 and 7, any other circuit which is capable of providing such a correction current may be employed. Further, while the preferred embodiment has been described with respect to an electrical resistance heater, the present invention may be employed to control the power dissipated by any type of electrical resistance.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. A circuit for controlling power dissipated by an electrical resistance coupled to a supply voltage, comprising:
    first means, electrically coupled to the electrical resistance, for providing a feedback current in dependence upon the current flowing through the electrical resistance without using a squaring circuit;
    second means for providing a correction current corresponding to variations in the supply voltage; and
    third means for receiving the correction current and the feedback current, for amplifying an error indicated by the correction current and the feedback current, and for controlling the current flowing through the electrical resistance to control the power dissipated by the electrical resistance.

2. A circuit according to claim 1,
    wherein said second means comprises:
    means for providing a variable current which varies in accordance with variations in the supply voltage; and
    means for providing a reference current.

3. A circuit according to claim 2, wherein said means for providing a reference current comprises:
    a Zener diode; and
    a first resistor coupled to said Zener diode and to a node.

4. A circuit according to claim 3, wherein said means for providing a variable current comprises a second resistor coupled to the supply voltage and to the node.

5. A circuit according to claim 4, wherein said circuit is coupled to an RMS reference voltage, and wherein said means for providing a reference current further comprises a third resistor coupled to the RMS reference voltage and the node.

6. A circuit according to claim 5, wherein said first means comprises a fourth resistor coupled to the node and to the electrical resistance.

7. A circuit according to claim 6, wherein said third means comprises:
    an integrator coupled to the node;
    a pulse width modulator coupled to said integrator; and
    a switching device, coupled to said pulse width modulator and to the electrical resistance, for controlling the flow of the current flowing through the electrical resistance.

8. A circuit according to claim 4, wherein said first means comprises a third resistor coupled to the node and to the electrical resistance.

9. A circuit according to claim 8, wherein said third means comprises:
    an integrator coupled to the node;
    a pulse width modulator coupled to said integrator; and
    a switching device, coupled to said pulse width modulator and to the electrical resistance, for controlling the flow of the current flowing through the electrical resistance.

10. A circuit for controlling power dissipated by an electrical resistance heater coupled to a supply voltage, comprising:
    first means, electrically coupled to the electrical resistance heater, for providing a feedback current based on the current flowing through the electrical resistance heater without using a squaring circuit;
    second means for providing a correction current corresponding to variations in the supply voltage; and
    third means for receiving the correction current and the feedback current, for amplifying an error indicated by the correction current and the feedback current, and for controlling the flow of current flowing through the electrical resistance heater to maintain the power dissipated by the electrical resistance heater constant.

11. A circuit according to claim 10,
    wherein said second means comprises:
    means for providing a variable current which varies in accordance with variations in the supply voltage; and
    means for providing a reference current.

12. A circuit according to claim 11, wherein said means for providing a reference current comprises:
    a Zener diode; and
    a first resistor coupled to said Zener diode and to a node.

13. A circuit according to claim 12, wherein said means for providing a variable current comprises a second resistor coupled to the supply voltage and to the node.

14. A circuit according to claim 13, wherein said circuit is coupled to an RMS reference voltage, and wherein said means for providing a reference current further comprises a third resistance coupled to the RMS reference voltage and the node.

15. A heater coupled to a supply voltage which varies, comprising:
    an electrical resistance heater, coupled to the supply voltage, for dissipating power as heat; and
    means for controlling the average current flowing through the electrical heater to produce an average heater current in accordance with the following equation:

$$I_{avg}(V_{BUS}) = \frac{I_{avg}(V_{nom}) V_{nom}}{V_{BUS}}$$

where $I_{avg}(V_{BUS})$ is the average heater current at the variable supply voltage, where $I_{avg}(V_{nom})$ is the average heater current at the nominal value of the variable supply voltage, where $V_{nom}$ equals the nominal value of the supply voltage, and where $V_{BUS}$ equals the value of the variable supply voltage, said controlling means not including a squaring circuit.

16. A heater according to claim 15, wherein said means for controlling the average current flowing through the electrical resistance heater comprises:

first means, coupled to the electrical resistance heater, for providing a feedback current corresponding to the current flowing through the electrical resistance heater;

second means for providing a correction current corresponding to variations in the supply voltage; and third means for receiving the correction current and the feedback current, for amplifying an error indicated by the correction current and the feedback current, and for controlling the flow of current flowing through the electrical resistance heater to maintain the power dissipated by the electrical resistance heater constant.

17. A heater according to claim 16,
wherein said second means comprises:
means for providing a variable current which varies in accordance with variations in the supply voltage; and
means for providing a reference current.

18. A heater according to claim 17, wherein said means for providing a reference current comprises:
a Zener diode; and
a first resistor coupled to said Zener diode and to a node.

19. A circuit according to claim 18, wherein said means for providing a variable current comprises a second resistor coupled to the supply voltage and to the node.

20. A heater according to claim 19, wherein said circuit is coupled to an RMS reference voltage and wherein said means for providing a reference current further comprises a third resistor coupled to the RMS reference voltage and the node.

21. A heater according to claim 15, wherein said means for controlling the average current flowing through the electrical resistance heater comprises means for increasing the average current when the variable supply voltage falls below its nominal value $V_{nom}$ and for decreasing the average current when the variable supply voltage rises above its nominal value $V_{nom}$.

* * * * *